United States Patent
Gengintani et al.

(10) Patent No.: US 7,068,325 B2
(45) Date of Patent: Jun. 27, 2006

(54) VIDEO SIGNAL PROCESSOR AND VIDEO SIGNAL PROCESSING METHOD

(75) Inventors: Yukinori Gengintani, Tokyo (JP); Hisafumi Motoe, Saitama (JP)

(73) Assignee: Sony Corporation, Tokyo (JP)

( * ) Notice: Subject to any disclaimer, the term of this patent is extended or adjusted under 35 U.S.C. 154(b) by 573 days.

(21) Appl. No.: 10/416,673

(22) PCT Filed: Sep. 10, 2002

(86) PCT No.: PCT/JP02/09203

§ 371 (c)(1),
(2), (4) Date: May 13, 2003

(87) PCT Pub. No.: WO03/026280

PCT Pub. Date: Mar. 27, 2003

(65) Prior Publication Data

US 2004/0027489 A1    Feb. 12, 2004

(30) Foreign Application Priority Data

Sep. 14, 2001    (JP) .............................. 2001-280230

(51) Int. Cl.
*H04N 5/14*    (2006.01)

(52) U.S. Cl. .................. 348/604; 348/606; 348/616; 348/617; 348/705; 348/526; 386/21; 386/113; 386/114

(58) Field of Classification Search ............... 348/604, 348/606, 616, 617, 705–706, 526; 386/21, 386/22, 113–115; H04N 5/14
See application file for complete search history.

(56) References Cited

U.S. PATENT DOCUMENTS

| 5,589,888 A * | 12/1996 | Iwasaki ...................... 348/669 |
| 5,831,673 A * | 11/1998 | Przyborski et al. ......... 348/239 |
| 5,940,141 A * | 8/1999 | Faroudja et al. ............ 348/628 |
| 6,366,327 B1 * | 4/2002 | Renner et al. .............. 348/558 |
| 6,466,624 B1 * | 10/2002 | Fogg ..................... 375/240.27 |
| 6,483,544 B1 * | 11/2002 | Murakami et al. .......... 348/441 |
| 2004/0196407 A1 * | 10/2004 | Gengintani et al. ......... 348/604 |

(Continued)

FOREIGN PATENT DOCUMENTS

EP    0 502 693    9/1992

(Continued)

OTHER PUBLICATIONS

Patent Abstracts of Japan, vol. 2000, No. 19, Jun. 5, 2001 & JP 2001 045335 A (Sony Corp), Feb. 16, 2001.

(Continued)

*Primary Examiner*—Brian P. Yenke
(74) *Attorney, Agent, or Firm*—Frommer Lawrence & Haug LLP; William S. Frommer

(57) ABSTRACT

The present invention relates to a video signal processing device for avoiding a phenomenon that noise is upwardly or downwardly shifted due to noise reducing operation when a non-standard signal is input. When a non-standard signal is input as an input video signal, coefficients of interpolating filters for carrying out interpolation on pixels of timely-sequential field video signals are fixed as a non-standard signal supporting signal processing. With this processing, interpolated pixels achieved by the interpolation processing are located at the same vertical spatial position, and pixels which are noise-reduced by the interpolated pixels are located at the same vertical spatial position as pixels before original noise is reduced, thereby locating the pixels at the same horizontal position.

8 Claims, 11 Drawing Sheets

U.S. PATENT DOCUMENTS

2005/0122341 A1 * 6/2005 MacInnis et al. ........... 345/558

FOREIGN PATENT DOCUMENTS

| EP | 0 685 968 | 12/1995 |
| JP | 2001-45334 | 2/2001 |
| JP | 2001-103341 | 4/2001 |
| JP | 2001-359098 | 12/2001 |

OTHER PUBLICATIONS

Patent Abstracts of Japan, vol. 2000, No. 21, Aug. 3, 2001 & JP 2001 103341 A (Sony Corp), Apr. 13, 2001.

Patent Abstracts of Japan, vol. 2000, No. 03, Mar. 30, 2000 & JP 11 341304 A(Texas Instr Inc & It; TI>), Dec. 10, 1999 *abstract*.

* cited by examiner

VIDEO SIGNAL PROCESSOR AND VIDEO SIGNAL PROCESSING METHOD

TECHNICAL FIELD

The present invention relates to a video signal processing device and a video signal processing method, and particularly to a video signal processing device and a video signal processing method with which noises superposed on video signals are removed.

BACKGROUND ART

A so-called cyclic type using a memory is known as a noise reducing circuit for reducing noises of digital signals, and particularly it is broadly applied in a case where noise reduction is carried out on digital video signals.

The applicant of this application previously proposed the construction of such a noise reducing circuit, and FIG. 11 shows the noise reducing circuit constructed on the basis of the previous proposal.

In the noise reducing circuit shown in FIG. 11, a video signal as a digital signal is first input to an input terminal 1. The video signal is a video signal based on the Interlace system in which even fields and odd fields are interlaced with one another, represented by the NTSC system, the PAL system or the like, for example.

An input video signal Din input to the input terminal 1 as described above is branched and input to an interpolating filter 2 and a subtracter 9, respectively.

The subtracter 9 subtracts a signal processed in a non-linear processing circuit 8 described later from the input video signal Din and outputs the subtraction result to an output terminal 13. As a result, a video signal output from which noises are reduced is achieved at the output terminal 13.

The video signal output supplied from the subtracter 9 to the output terminal 13 is branched and output to a field memory 4, and written in the field memory 4.

The output from the field memory 4 corresponds to a preceding field video signal Dpre which is preceding to the current field by one field. The preceding field video signal Dpre is output to an interpolating filter 5.

Here, the video signal of the current field (field image data) is input to the interpolating filter 2 to which the input video signal Din is input, and the preceding field video signal Dpre which is delayed at the timing corresponding to one field by the field memory 4 is input to the interpolating filter 5.

The interpolating filters 2, 5 will be later described in detail in the following embodiments, however, the interpolation of pixels in the vertical direction of input video signals is carried out in these filters by setting required coefficients for the pixels in the vertical direction. The setting of the coefficients in the interpolating filters 2, 5 is alternately switched at the timing corresponding to each field period in accordance with the phase relationship between the current field image and the field image which is preceding to the current field image by one field.

The spatial phase relationship of the pixels in the vertical direction is made coincident between interpolation video signals Dp1, Dp2 output from the interpolating filters 2 and 5 by performing the interpolation processing in each of the interpolating filters 2, 5.

The interpolation video signals Dp1, Dp2 which have been subjected to the interpolation processing in the interpolating filters 2, 5 are written in work memories 3, 6 respectively.

Each of the work memories 3, 6 comprises a delay circuit such as a delay line or the like.

In this case, a video signal is supplied from each of the work memories 3, 6 to a motion vector detection circuit 10.

The interpolation video signal Dp1 of the current field timing is output from the work memory 3, however, the interpolation video signal Dp2 which is delayed by one field with respect to the current field is output from the work memory 6.

In the motion vector detection circuit 10, a motion vector is detected by using the video signals which are input from the work memories 3 and 6 and have the time difference corresponding to one field.

Furthermore, a vector validity/invalidity judging circuit 11 judges validity/invalidity of a candidate vector detected in the motion vector detection circuit 10. That is, it is judged whether the candidate vector is applied to motion compensation or not.

A memory controller 12 controls the work memories 3, 6 with respect to the motion compensation on the basis of the judgment result of the vector validity/invalidity judging circuit 11. That is, if it is judged in the vector validity/invalidity judging circuit 11 that the candidate vector is valid, the memory controller 12 transmits motion compensation control signals to the work memories 3, 6 so that the motion compensation processing is carried out on the video signals on the basis of the candidate vector.

Furthermore, under the control of the memory controller 12, video signals are read out from the work memories 3, 6 so that the motion compensation is carried out by using a detected motion vector. The video signals thus read out are supplied to the subtracter 7 to calculate the subtraction between the video signals, whereby a motion-compensated signal is attained as a differential signal achieved by subtracting the video signal output from the work memory 6 from the video signal output from the work memory 3.

The non-linear processing circuit 8 carries out attenuation processing on the differential signal output from the subtracter 7 by using a required characteristic curve. That is, small-amplitude signal components are extracted from the differential signal output from the subtracter 7, so that noise component signals comprising noise components are extracted. The output of the non-linear processing circuit 8 is input to the subtracter 9.

In the subtracter 9, the output signal of the non-linear processing circuit 8 which corresponds to the noise component signals is subtracted from the input video signal Din.

The signal achieved through the subtraction described above in the subtracter 9 is output as a noise-reduced video signal from the output terminal 13. Further, the signal is also written in the field memory 4 and used for the noise reducing processing at the next field timing.

In the case of VTR (Video Tape Recorder) or the like, not only normal equi-speed reproduction is carried out, but also speed-varied reproduction such as fast feeding, rewinding, picture search, etc. is carried out.

Here, when a video signal is based on the interlace system, with respect to a video signal reproduced on the basis of the normal equal-speed reproduction, the horizontal synchronous pulses of the video signals of even fields and odd fields are shifted from each other in phase position by 0.5 line with respect to the vertical synchronous pulses. In this case, such a signal will be referred to as "standard signal".

On the other hand, with respect to a video signal reproduced on the basis of the speed-varied reproduction, the horizontal synchronous pulses of the video signal of the even fields and the odd fields are in phase with respect to the vertical synchronous pulses. In this case, such a signal will be referred to as "non-standard signal".

Therefore, considering a case where the noise reducing circuit shown in FIG. 11 is installed in a device like VTR in which not only a standard signal is reproduced, but also a non-standard signal based on the speed-varied reproduction or the like may be reproduced, the noises can be normally reduced by the operation described with reference to FIG. 11 when the standard signal is input.

However, when the non-standard signal is input, the horizontal synchronous pulses of the video signals of the even fields and the odd fields are in phase, so that it cannot be correctly judged whether the current field is an even field or an odd field. If the noise reducing operation containing the interpolation processing by the interpolating filters 2, 5 is carried out under the above state, the noises could not be effectively reduced.

As an example of the improper noise reducing operation, as the principle will be described later, there is such a case that a noise to be reduced is viewed as moving to the upper side or lower side on an image. It has been found that when the noise reduction processing is normally carried out on the standard signal, the noise is reduced at the same position, however, when the noise to be reduced moves as described above, it is more conspicuous than when the noise is reduced at the same position, and thus pictures are more seamy.

As described above, the construction of the present noise reducing device has the problem that the noise reducing performance at the input time of the non-standard signal is not sufficiently high.

DISCLOSURE OF THE INVENTION

Therefore, in consideration of the foregoing problem, the present invention has the following construction in a video signal processing device for reducing noises for video signals.

That is, the video signal processing device of the present invention is equipped with interpolating means for executing standard-signal support interpolation processing corresponding to interpolation processing for making coincident the spatial positions of pixels in the vertical direction of an input video signal of a prescribed picture unit and a preceding input video signal which is preceding to the former input video signal by one picture unit when the input video signal is a standard signal.

Furthermore, the video signal processing device of the present invention is equipped with differential means for achieving a differential signal for the input video signal interpolatively processed by the interpolating means and the one-picture-unit preceding input video signal which is interpolatively processed by the interpolating means, noise component signal extracting means for extracting a noise component signal from the differential signal achieved by the differential means, synthesizing means for synthesizing a noise component signal for the input video signal, and judging means for judging whether the input video signal is a standard signal or non-standard signal.

When it is judged by the judging means that the input video signal is a standard signal, the interpolating means executes the standard-signal supporting interpolating processing. When it is judged that the input video signal is a non-standard signal, the interpolating means or the noise component signal extracting means executes required non-standard signal supporting processing corresponding to the non-standard signal concerned.

Furthermore, a video signal processing method is constructed as follows.

That is, the method executes an interpolating step for executing standard-signal support interpolation processing corresponding to interpolation processing for making coincident the spatial positions of pixels in the vertical direction of an input video signal of a prescribed picture unit and a preceding input video signal which is preceding to the former input video signal by one picture unit when the input video signal is a standard signal.

Furthermore, the method executes a differential step for achieving a differential signal for the input video signal interpolatively processed in the interpolating step and the one-picture-unit preceding input video signal which is interpolatively processed in the interpolating step, a noise component signal extracting step for extracting a noise component signal from the differential signal achieved in the differential step, a synthesizing step for synthesizing a noise component signal for the input video signal, and a judging step for judging whether the input video signal is a standard signal or non-standard signal.

When it is judged in the judging step that the input video signal is a standard signal, the interpolating step executes the standard-signal supporting interpolating processing. When it is judged that the input video signal is a non-standard signal, the interpolating step or the noise component signal extracting step executes required non-standard signal supporting processing corresponding to the non-standard signal concerned.

According to each construction, the standard-signal interpolation processing is carried out on the input video signal of the prescribed picture unit and the one-picture-unit preceding input video signal as the basic operation to reduce the noises, whereby when the input video signal is a standard signal, the spatial pixel positions of pixels in the vertical direction are properly coincident between the current input video signal and the one-picture-unit preceding input video signal. Both the signals which have been subjected to the standard signal support interpolation processing are subjected to subtraction to achieve a differential signal, and a noise component signal is further achieved from the differential signal. Thereafter, the current input video signal and the noise component signal are composed with each other (subtracted from each other) to achieve a video signal in which the noises are reduced.

According to the present invention, in addition to the above operation, it is judged whether the input video signal is a standard signal or non-standard signal. When the input video signal is a standard signal, the noise reduction processing containing the above standard signal support interpolation processing is carried out. On the other hand, when the input video signal is a non-standard signal, the required processing corresponding to the non-standard signal, that is, the non-standard signal supporting processing is executed.

According to the above construction, when the input video signal is a non-standard video signal, no standard signal support interpolation processing is carried out, and the other signal processing corresponding to the non-standard video signal is directly carried out. That is, the noise reduction processing corresponding to the standard signal is carried out irrespective of whether the input video signal is a non-standard video signal or not, so that the improper noise reducing operation can be avoided.

BEST MODE FOR CARRYING OUT THE INVENTION

An embodiment according to the present invention will be described hereunder.

A video signal processing device according to this embodiment is set as a noise reducing circuit for reducing noises for digital video signals.

The noise reducing circuit according to this embodiment may be applied to any general devices such as VTR, a disc recording/reproducing device in which video signals are recordable/reproducible, and further devices which support ground waves or satellite broadcast and carry out video signal processing, such as a video tuner, a television set, etc. insofar as they carry out the processing on video signals based on the interlace system such as the NTSC system, the PAL system or the like under the present circumstances.

Furthermore, the noise reducing circuit of this embodiment is based on the assumption that any one of a standard signal and a non-standard signal is input as an input video signal, and the standard signal and the non-standard signal will be hereunder described.

In this embodiment, the standard signal is defined as a video signal based on the normal interlace system. That is, the video signal based on the interlace system includes odd fields and even fields which are alternately arranged. When the 1 horizontal scanning period is represented by 1H, the positions (phase) of the horizontal synchronous pulses of continuous odd and even fields with respect to the vertical synchronous pulses are shifted from each other by 0.5H. Accordingly, the spatial positional relationship in which the pixel horizontal lines of the odd and even fields are alternately arranged is achieved. Therefore, the video signals of the odd and even fields are subjected to interlace scanning to form a one-field image.

Besides, the non-standard signal is a video signal achieved when speed-varied reproduction such as pause, fast feeding, rewinding, picture search or the like is carried out in video signal reproducing equipment such as VTR, and the positions of the horizontal synchronous pulses of the odd and even fields with respect to the vertical synchronous pulse are in phase.

Figure 1:
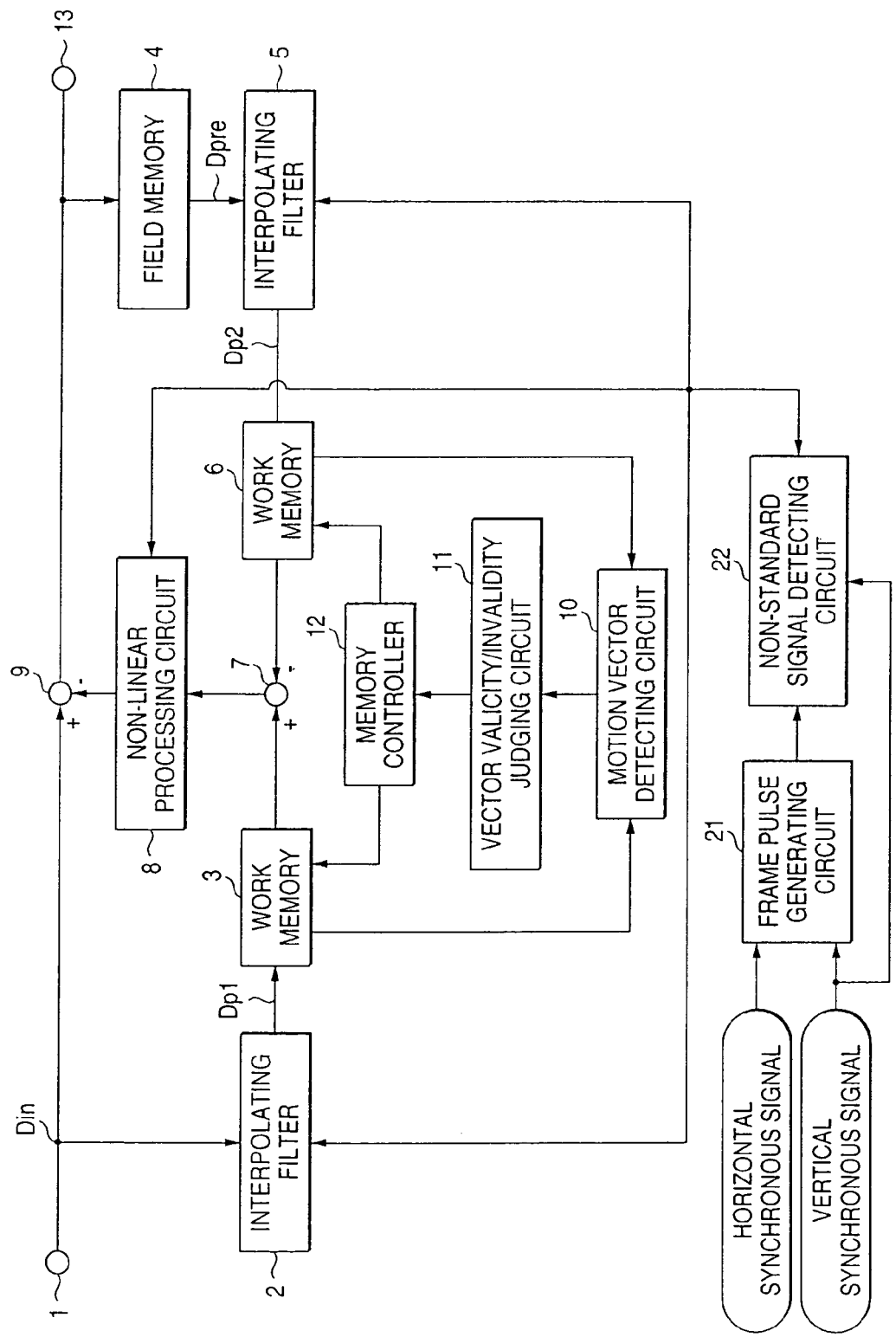
FIG. 1 is a block diagram showing an example of the construction of a noise reducing circuit according to an embodiment of the present invention.

FIG. 1 shows an example of the construction of the noise reducing circuit which is an embodiment of the video signal processing device of the present invention.

A video signal is input as a digital signal from the input terminal 1. When a video signal is an analog signal, the video signal is A–D converted to a digital signal at a front stage not shown in the drawings, and then the video signal thus converted is input.

Here, the input video signal Din input to the noise reducing circuit of this embodiment is assumed as a video signal based on the interlace system. The interlace-system signal contains "standard signal", and "non-standard signal", and the noise reducing circuit of this embodiment is based on the assumption that both "standard signal" and "non-standard signal" are input. When a basic noise reducing operation is hereunder described with respect to the construction of the noise reducing circuit described below, it is assumed that a "standard signal" is input.

The input video signal Din input from the input terminal 1 is branched and input to the subtracter 9 and the interpolating filter 2.

In the subtracter 9, the noise component signal output from the non-linear processing circuit 8 described later is subtracted from the input video signal Din to compose these signals. The signal as the subtraction result is output from the output terminal 13 as a video signal which has been subjected to the noise reduction processing.

The video signal after the noise reduction processing which is output from the subtracter 9 is fed back to the noise reducing circuit and used for the noise reduction processing of a next field as described later.

The video signal which is output from the subtracter 9 and will be fed back to the noise reducing circuit is written in the field memory 4. The field memory 4 successively holds the video signal of one field, for example, and the video signal read out and output from the field memory 4 is delayed by the time corresponding to the one field period. Accordingly, a preceding field video signal Dpre which is preceding to the current input video signal Din by one field is achieved as the output of the field memory 4. The preceding field video signal Dpre is output to the interpolating filter 5.

In the foregoing description, the noise reducing circuit of this embodiment is equipped with the two interpolating filters 2, 5, and the current input video signal Din is input to the interpolating filter 2 while the preceding field video signal Dpre corresponding to the video signal which is preceding to the current input video signal Din by one field is input to the interpolating filter 5.

The interpolating filters 2, 5 are provided in connection with the assumption that the video signal to be subjected to the noise reduction processing is based on the interlace system. The basic interpolation processing of these interpolating filters 2, 5 will be described with reference to FIGS. 2 and 3.

Figure 2:
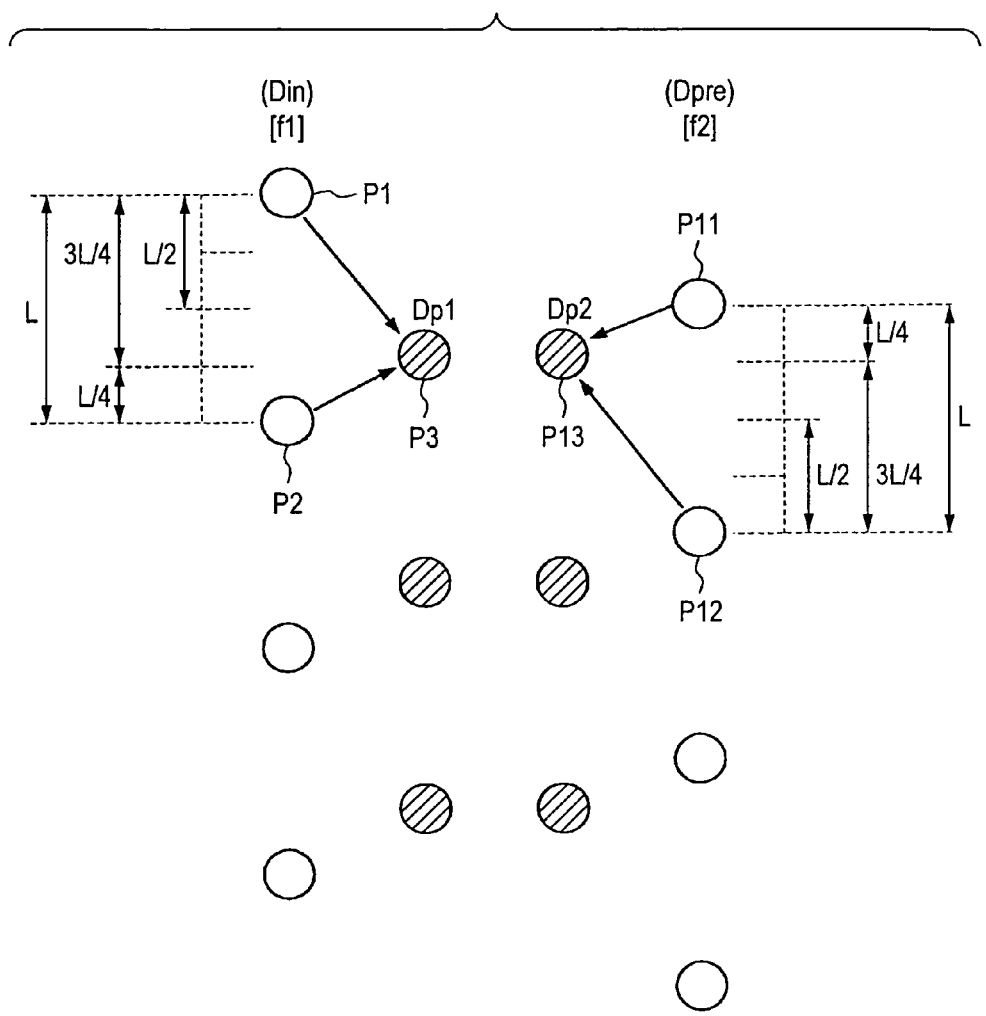
FIG. 2 is a diagram showing the interpolation processing of an interpolating filter.

Here, as shown in FIG. 2, it is assumed that the input video signal Din input to the interpolating filter 2 corresponds to the video signal of an add field as a field f1, and also the preceding field video signal Dpre input to the interpolating filter 5 corresponds to the video signal of an even field as a field f2.

In this case, the pixels P11, P12 of the preceding field video signal Dpre of the second field f2 are located to be alternately spatially displaced in the up-and-down (vertical) direction with respect to the pixels P1, P2 of the input video signal Din of the field f1.

That is, representing the interval of the pixels in the vertical direction within the fields f1 and f2 (line interval) by L, each pixel of one field is located at the intermediate position which is far away from the adjacent pixels in the vertical direction of the other field at an equal distance of L/2. In the case of FIG. 2, the pixels P11, P12 of the field f2 are located at the positions which are lower from the adjacent pixels P1, P2 in the up-and-down direction in the field f1 by the distance of L/2, respectively. Viewing from the field f2 side, the pixel P2 is located at the position which is far away at the equal distance of L/2 from the adjacent pixels P11, P12 in the up-and-down direction at the field f2 side.

The interpolating filter 2 to which the input video signal Din as the field f1 is input generates an interpolated video signal Dp1 by using the pixel data of the input video signal Din, and the interpolating filter 5 to which the preceding field video signal Dpre as the field f2 is input generates an interpolated video signal Dp2 by using the pixel data of the preceding field video signal Dpre.

That is, as a result of the interpolation processing, the pixel P3 as the interpolated video signal Dp1 is located at a distance of 3:1 with respect to the interval of the pixels P1 and P2 of the input video signal Din (f1) before the interpolation. That is, the pixel P3 is located at a distance of 3L/4 from the pixel P1 and also at a distance of L/4 from the pixel P2.

Accordingly, the coefficients for interpolation in the interpolating filter 2 are set to have a ratio of 1:3 in connection with the above relationship. That is, the coefficients corresponding to the respective values of the pixels P1 and P2 are respectively set to ¼ and ¾ to weight the values of the pixels P1 and P2, and then these values thus weighted are added to each other to calculate the value of the pixel P3.

Furthermore, the pixel P13 of the interpolated video signal Dp2 is located at a distance of 1:3 with respect to the interval of the pixels P11 and P12 of the preceding field video signal Dpre (f2) before the interpolation. That is, the pixel P13 is located at a distance of L/4 from the pixel P11 and also at a distance of 3L/4 from the pixel P12.

Therefore, the coefficients for interpolation in the interpolating filter 2 are set to have a ratio of 3:1, that is, the coefficients corresponding to the values of the pixels P11, P12 are respectively set to ¾ and ¼. The values of the pixels P11 and P12 are weighted by the coefficients and added to each other to calculate the value of the pixel P13.

Through the interpolation calculation as described above, the respective pixels of the interpolated video signal Dp1 achieved by interpolating the input video signal Din of the first field and the interpolated video signal Dp2 achieved by interpolating the preceding field video signal Dpre of the second field are set so as to be located spatially coincidentally in the vertical direction as shown in the figure.

Figure 3:
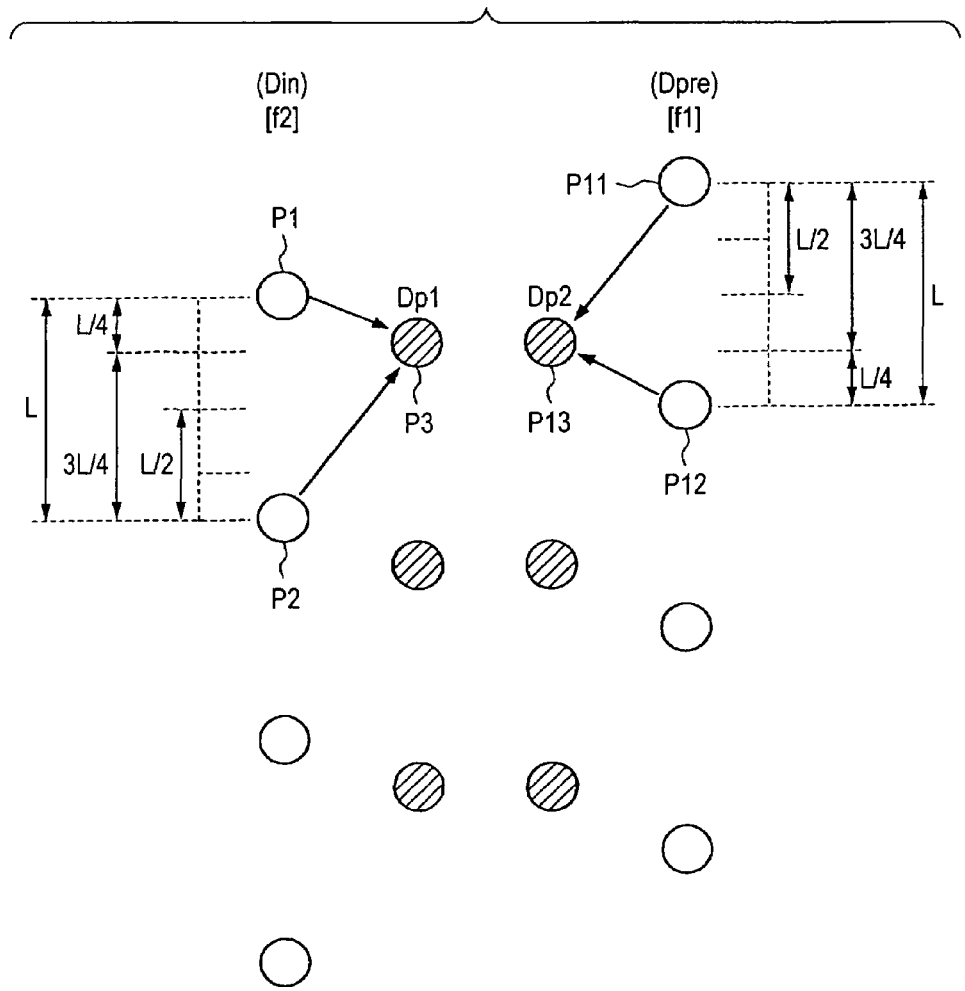
FIG. 3 is a diagram showing the interpolation processing of the interpolating filter.

FIG. 3 shows a case where the input video signal Din input to the interpolating filter 2 is the video signal of an even field as a field f2 and the preceding field video signal Dpre input to the interpolating filter 5 is the video signal of an odd field as a field f1 contrary to the case of FIG. 2.

In the case of FIG. 3, the pixels P11, P12 of the preceding field video signal Dpre as the first field f1 are also located to be alternately displaced spatially in the up-and-down (vertical) direction with respect to the pixels P1, P2 of the input video signal Din as the field f2, however, the positional relationship in the up-and-down direction is different from that of FIG. 2.

That is, the pixels P11, P12 of the first field f1 are respectively located at upper positions which are respectively far away from the adjacent pixels P1, P2 in the up-and-down direction in the field f2 by a distance of L/2. When viewing from the field f1 side, the pixel P1 is located at an equal distance of L/2 from the adjacent pixels P11, P12 in the up-and-down direction at the field f1 side.

Therefore, in this case, the coefficients for interpolation in the interpolating filter 2 are set to have a ratio of 3:1 by setting the coefficients corresponding to the values of the pixels P1, P2 to ¾ and ¼, respectively. The pixels P1, P2 which are multiplied by the coefficients and thus weighted as described above are added to each other to calculate the value of the pixel P3.

Through the interpolation processing as described above, the pixel P3 of the interpolated video signal Dp1 is located at a distance of 1:3 with respect to the interval of the pixels P1 and P2 of the input video signal Din (f2) before the interpolation. That is, the pixel P3 is located at a distance of L/4 from the pixel P1, and also at a distance of 3L/4 from the pixel P2.

With respect to the coefficients for the interpolation in the interpolating filter 5, the coefficients for the respective values of the pixels P11, P12 are set to ¼ and ¾ respectively so that the ratio of the coefficients is equal to 1:3. The values of the pixels P11, P12 which are multiplied and weighted by the coefficients as described above are added to each other to calculate the value of the pixel P13.

Through the interpolation processing as described above, the pixel 13 of the interpolated video signal Dp2 is located at a distance of 3:1 with respect to the interval of the pixels P11, P12 of the preceding field video signal Dpre (f1) before the interpolation. That is, the pixel P13 is located at a distance of 3L/4 from the pixel P11 and also at a distance of L/4 from the pixel P12.

That is, in the case of FIG. 3, the interpolating filter 2 is provided with the coefficients set to the interpolating filter 5 in FIG. 2, and the interpolating filter 5 is provided with the coefficients set to the interpolating filter 2 in FIG. 2.

In this case, by executing of the interpolation processing as described above, the respective pixels of the interpolated video signal Dp1 achieved by interpolating the input video signal Din of the first field and the interpolated video signal Dp2 achieved by interpolating the preceding field video signal Dpre of the second field are also located spatially coincidentally in the vertical direction.

As described above, the interpolation processing of the interpolating filters 2, 5 is carried out by setting the coefficients described with reference to FIG. 2 when the input video signal Din corresponds to an odd field and the preceding field video signal Dpre corresponds to an even field or by setting the coefficients described with reference to FIG. 3 (contrary to FIG. 2) when the input video signal Din corresponds to an even field and the preceding field video signal Dpre is an odd field. Through this interpolation processing, the spatial positions of the pixels in the vertical direction of field images which are displaced timely before and after are set to be spatially coincident in the vertical direction.

When the input video signal Din is a standard signal, the video signals of each even field and each odd field are alternately input. Therefore, each of the interpolating filters 2, 5 alternately carries out the interpolation processing shown in FIGS. 2 and 3 every field period. The coefficients are set in the interpolating filters 2, 5 so as to be exchanged to each other between the interpolating filters 2, 5 every field period.

The description is returned to FIG. 1.

The input video signal Din and the preceding field video signal Dpre which have been subjected to the interpolation processing in the interpolating filters 2, 5 as described above are respectively written as the interpolated video signals Dp1, Dp2 into the work memories 3, 6, respectively. Each of the work memories 3, 6, comprises a delay circuit such as a delay line. The writing/reading into/from the work memories 3, 6 is carried out under the control of the memory controller 12.

In this case, the work memories 3, 6 are equipped to be interposed between the interpolating filter 2 and the subtracter 7 and between the interpolating filter 5 and the subtracter 7 respectively in order to hold the video signals for motion vector detection in the motion vector detecting circuit 10 described later.

The interpolated video signals Dp1, Dp2 written in the work memories 3, 6 are output to the motion vector detecting circuit 10.

The interpolated video signals Dp1, Dp2 input to the motion vector detecting circuit 10 have the time difference corresponding to one field period because they are originated from the input video signal Din and the preceding field video signal Dpre.

With respect to the input video signal Din and the preceding field video signal Dpre having the time difference, the signals thereof on lines which are regarded as being identical to one another in some search range are compared with one another by block matching, and a motion vector is determined every block in the motion vector detecting circuit 10. The minimum unit of the motion vector is set to one pixel. The information of the motion vector (candidate vector) detected in the motion vector detecting circuit 10 is input to the vector validity/invalidity judging circuit 11.

In the vector validity/invalidity judging circuit 11, it is judged on the basis of the value of an input candidate vector whether an application to motion compensation for the candidate vector is valid or invalid. The information of the judgment result is input to the memory controller 12.

When the judgement result information indicating that the candidate vector is valid is input from the vector validity/invalidity judging circuit 11 to the memory controller 12, the memory controller 12 sets the signal reading timing from the work memories 3, 6 so that motion compensation can be performed on the basis of the candidate vector.

The interpolated video signals Dp1, Dp2 read out from each of the work memories 3, 6 as described above are input to the subtracter 7, and a subtraction calculation represented by Dp1–Dp2 is carried out to achieve a differential value thereof. The differential signal achieved through this calculation is a motion-compensated video signal. By carrying out the motion compensation as described above, it can be prevented to carry out noise reduction in the subsequent processing because a motion of an image is misidentified as a noise.

The non-linear processing circuit 8 subjects the input differential signal to the non-linear processing to attenuate the differential signal by using a required characteristic curve, thereby extracting a noise component signal.

Represented by white noise, for example, the amplitude of noise components superposed on the video signal is small. Therefore, by carrying out the non-linear processing on the video signal as the differential signal, a noise component signal which is regarded as being composed of only the noise components can be achieved.

The noise component signal achieved in the non-linear processing circuit 8 as described above is input to the subtracter 9.

In the subtracter 9, the noise component signal is subtracted from the input video signal Din to carry out signal synthesizing processing. Accordingly, a noise-reduced video signal is output from the subtracter 9. The video signal output from the subtracter 9 is supplied as the output of the noise reducing circuit to the output terminal 13.

The output signal of the subtracter 9 is also written in the field memory 4, and thus it is used as the preceding field video signal Dpre for the noise reduction processing during a next field period.

The noise reducing operation as described above is repeated every field period, and the noises are removed and converged.

The foregoing is the basic noise reducing operation in the noise reducing circuit shown in FIG. 1. That is, the noise reducing operation corresponding to the standard signal has been described.

In the noise reducing circuit of this embodiment, a frame pulse generating circuit 21 and a non-standard signal detecting circuit 22 are equipped to support a case where a non-standard video signal is input as the input video signal Din.

The frame pulse generating circuit 21 is supplied with the horizontal synchronous signal pulse and the vertical synchronous signal pulse which are separated and extracted from the input video signal Din to generate a frame pulse FD, and outputs the frame pulse FD thus generated.

In the case of "standard signal", the horizontal synchronous signal pulses of the even field and the odd field are shifted from each other in phase by 0.5H with respect to the vertical synchronous signal pulses as described above. Therefore, in the frame pulse generating circuit 21, the phase of the horizontal synchronous signal pulses is detected on the basis of the input timing of the vertical synchronous signal pulses to achieve a signal which is inverted between the even field period and the odd field period. That is, when the standard signal is input, there is achieved a signal which is inverted in accordance with the exchange of the odd/even fields every field period. This signal corresponds to the frame pulse FD.

The frame pulse FD generated in the frame pulse generating circuit 21 is output to the non-standard signal detecting circuit 22.

The non-standard signal detecting circuit 22 is supplied with the frame pulse FD and the vertical synchronous signal pulse to detect whether the current input video signal Din is a standard signal or non-standard signal.

If the input video signal Din is a standard signal, the frame pulse FD corresponds to a signal which is inverted every field as described above. On the other hand, if the input video signal Din is a non-standard signal, the frame pulse FD corresponds to a signal whose H level or L level is continuous despite of lapse of the field period because there is no phase difference of the horizontal synchronous signal pulses with respect to the vertical synchronous signal pulses between the even and odd fields.

Therefore, the non-standard signal detecting circuit 22 compares the appearing timing of the vertical synchronous signal pulse with the inverting timing of the frame pulse FD. If such a state that the frame pulse FD is inverted every appearing timing of the vertical synchronous signal pulse is continued, the non-standard signal detecting circuit 22 detects the input video signal as a standard signal. On the other hand, if the frame pulse FD is inverted in such a style that the frame pulse FD is not inverted every appearing timing of the vertical synchronous signal pulse, but the level of the frame pulse FD is continued over plural field periods, the non-standard signal detecting circuit 22 detects the input video signal as a non-standard signal.

The details will be described later, however, when a detection signal indicating detection of a non-standard signal is input from the non-standard signal detecting circuit 22, the interpolating filters 2, 5 execute the other interpolating processing, etc. for the non-standard signal in place of the interpolation processing for the standard signal as shown in FIGS. 2 and 3. Alternatively, the operation is set to OFF, and the input signal is directly output without carrying out the interpolation processing.

Accordingly, according to this embodiment, the noise reducing operation can be properly performed even when a non-standard signal is input as described later.

In the construction of the noise reducing circuit which is shown as a prior art in FIG. 11, the noise reducing operation containing the execution of the interpolation processing described with reference to FIGS. 2 and 3 is fixedly executed irrespective of whether the input video signal Din is a standard signal or a non-standard signal.

Figure 11:
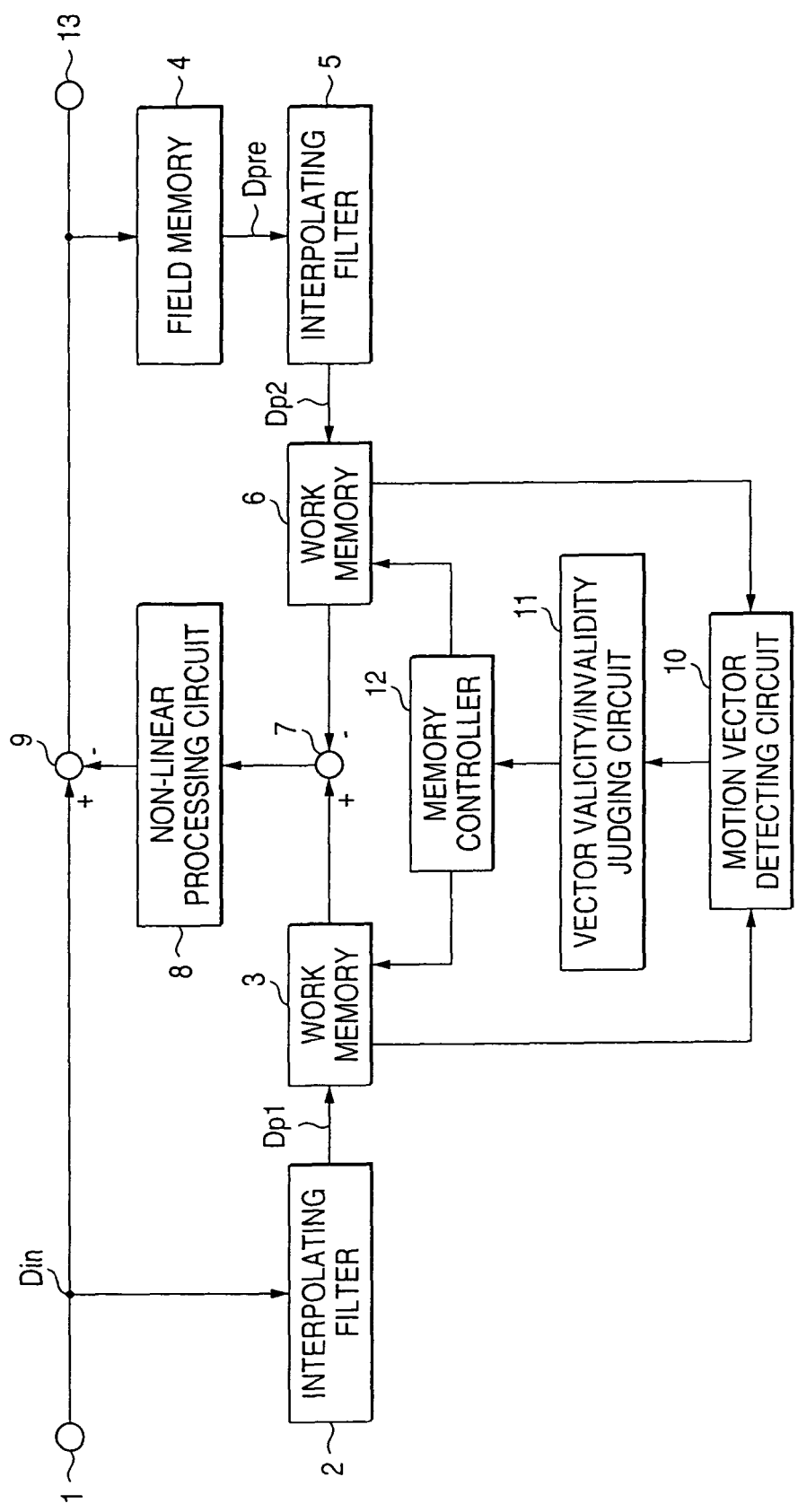
FIG. 11 is a block diagram showing an example of the construction of a conventional noise reducing circuit.

However, the construction of the noise reducing circuit as shown in FIG. 11 may sometime prevent an effective noise reducing operation when a non-standard signal is input. This will be described with reference to FIGS. 4, 5 and 6.

Figure 4:
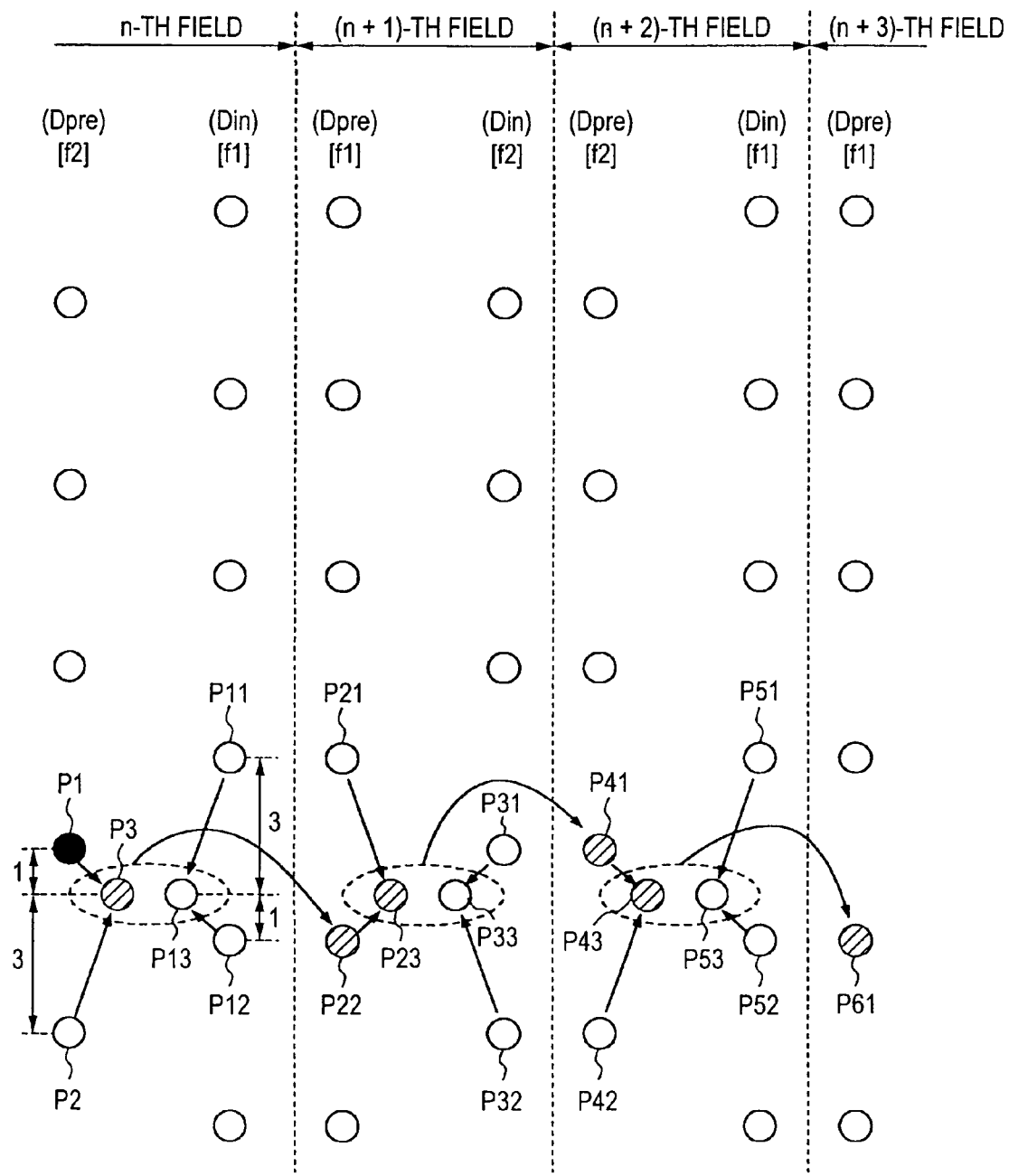
FIG. 4 is a diagram schematically showing a noise reducing operation containing standard-signal support interpolation processing in the case of inputting a standard signal.

FIG. 4 schematically shows the noise reducing operation when a standard signal is input as the input video signal Din to the noise reducing circuit shown in FIG. 11.

In FIG. 4, for convenience of description, an array of pixels at the left side within each field period is set to a preceding field video signal Dpre read out from the field memory 4, and an array of pixels at the right side is set to an input video signal Din input from the input terminal 1. That is, the positional relationship between the input video signal Din and the preceding field video signal Dpre is opposite to that of the interpolation processing shown in FIGS. 2 and 3. This is also satisfied in the case of FIGS. 5 to 9 described later.

It is assumed that a standard signal is input. As shown in FIG. 4, at the timing of some n-th field, the video signal of a field f1 corresponding to an odd field is input as the input video signal Din as shown as the pixel array at the right side. Furthermore, the video signal of a field f2 corresponding to an even field as shown as a pixel array at the left side in FIG. 4 is input as the preceding field video signal Dpre read out from the field memory 4.

In this case, the two adjacent [pixels P1, P2] in the vertical direction in the video signal of the field f2 corresponding to the preceding field video signal Dpre and the two adjacent [pixels P11, P12] in the vertical direction in the video signal of the field f1 corresponding to the input video signal Din have such a positional relationship that [pixels P11, P12] is upwardly shifted by the distance corresponding to ½ pixel with respect to the interval of the pixels P1 and P2.

For convenience of description, it is assumed that the pixel P1 represented by • is a pixel on which noise is superposed, and the other pixels represented by o are pixels on which no noise is superposed.

In the positional relationship as described above, the interpolation processing corresponding to FIG. 2 is executed in each of the interpolating filters 2, 5, whereby an interpolated pixel P3 is achieved by using [pixels P1, P2] of the field f2. The interpolated pixel P3 is set to be located at a distance of 1:3 in the vertical direction with respect to the interval of the pixels P1 and P2.

Furthermore, an interpolated pixel P13 is achieved by using [pixels P11, P12] of the field f1. The interpolated pixel P13 is set to be located at a distance of 3:1 in the vertical direction with respect to [pixels P11–P12].

As a result, the interpolated pixel P3 and the interpolated pixel P13 are set to be spatially located at the same position in the vertical direction. By using the interpolated pixel P3 and the interpolated pixel P13, the subsequent noise reducing operation is carried out in the subtracter 7, the non-linear processing circuit 8 and the subtracter 9. A noise-reduced pixel is achieved by using the interpolated pixel P3 and the interpolated pixel P13 through the noise reducing operation. That is, noise is reduced from the pixel P1, and a pixel in which black color gets thinner is achieved. This pixel is achieved as a pixel P22 of the field f1 in the next (n+1)-th field. That is, it is achieved as one pixel of the preceding field video signal Dpre read out from the field memory 4 at the next field timing.

As is apparent from the comparison of the positional relationship in the vertical direction between the interpolated pixels P3, P13 in the n-th field and the pixels P21, P22 of the field f1 in the (n+1)-th field, the pixel P22 is nearer to the interpolated pixels P3, P13 than pixel P21. Through the operation of the non-linear processing circuit 8 and the subtracter 9, a pixel nearer to the vertical position of an interpolated pixel is output as a noise-reduced pixel.

In the subsequent (n+1)-th field, the corresponding relationship between the field f2/f1 and the video signal Din/Dpre is opposite to that of the preceding n-th field. Therefore, as shown in FIG. 3, the interpolation is carried out on the field f1 so that the interpolated pixel P23 is achieved at a distance of 3:1 with respect to the position of [pixel P21-pixel P22], and the interpolation is carried out on the field f2 so that the interpolated pixel P33 is achieved at a distance of 1:3 with respect to the position of [pixels P31–P32], whereby the respective interpolated pixels are set to be positionally coincident with one another in the vertical direction. A pixel P41 of the field f2 in the next (n+2)-th field is achieved as a pixel achieved by executing the noise-reducing processing after the interpolation processing for the interpolated pixels P23, P33.

In the (n+2)-th field subsequent to the (n+1)-th field, the corresponding relationship between the field f2/field f1 and the video signal Din/Dpre is the same as the preceding n-th field. Therefore, as shown in FIG. 2, the interpolation is carried out on the field f2 so that an interpolated pixel P43 is achieved at a distance of 1:3 with respect to the interval of the pixels P41 and P42, and the interpolation is carried out on the field f1 so that an interpolated pixel P53 is achieved at a distance of 3:1 with respect to the pixels P51 and P52, whereby the interpolated pixels are positionally coincident with each other in the vertical direction. By executing the noise reducing processing after the interpolation processing, a pixel P61 of the field f1 in the next (n+3)-th field is achieved as a noise-reduced pixel by using the interpolated pixels P43, P53.

By repetitively carrying out the operation as described above, noises are gradually reduced (getting white) from a pixel located at the position corresponding to the pixel P1 on which an original noise is assumed to be superposed.

As is apparent from FIG. 4, noise-superposed pixels originating from the pixel P1 (P22, P41, P61) are kept to be located at the same vertical spatial position without shifting in any up-and-down direction in the odd/even fields despite of lapse of the field period.

In this specification, the interpolation processing shown in FIGS. 2 and 3 is alternately executed every field period as described with reference to FIG. 4, and the interpolation processing through which a proper interpolation result is achieved for the standard signal is also called as "standard signal support interpolation processing".

Figure 5:
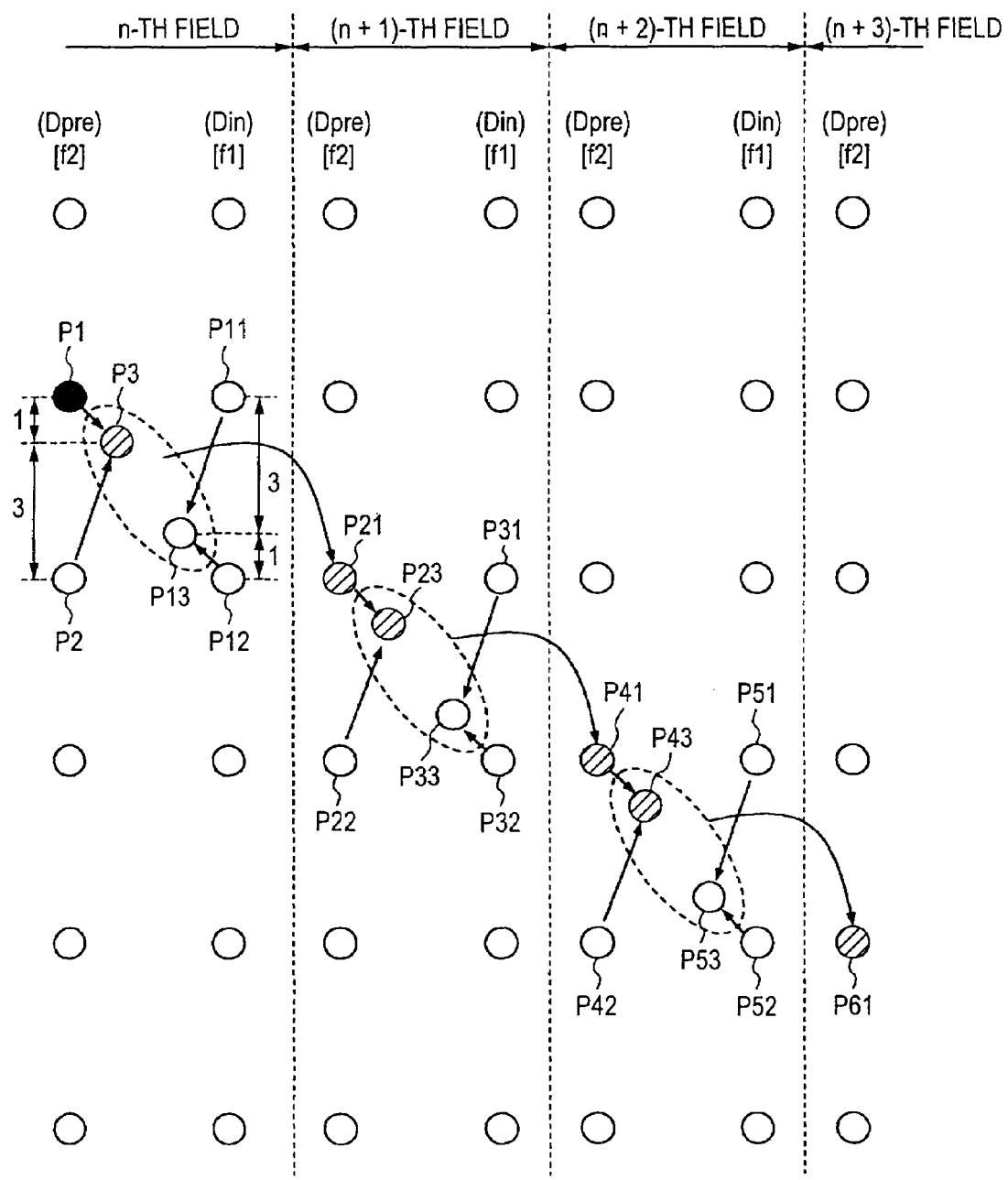
FIG. 5 is a diagram schematically showing the noise reducing operation when the standard-signal support interpolation processing is carried out in the case of inputting a non-standard signal.
Figure 6:
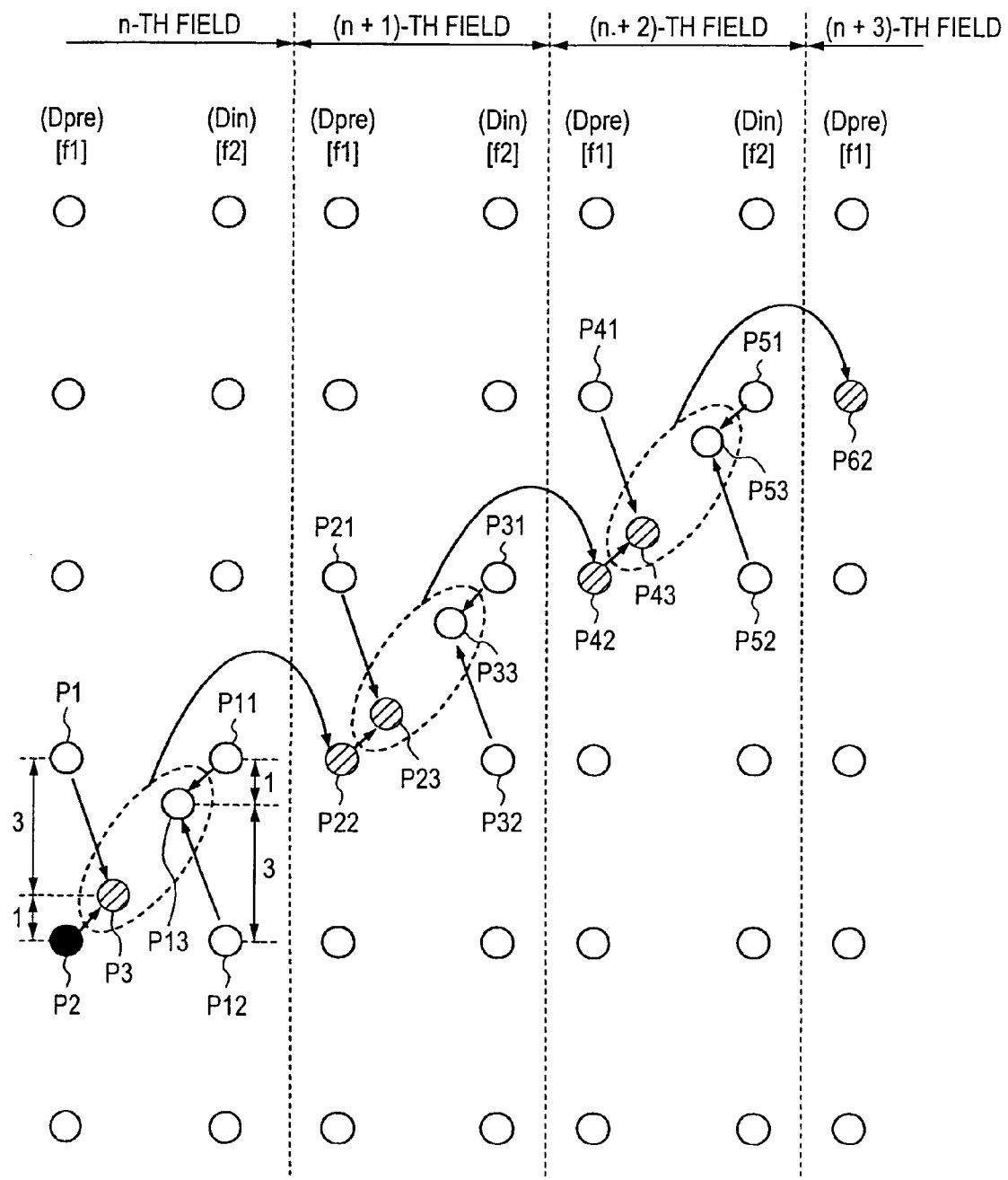
FIG. 6 is a diagram schematically showing the noise reducing operation when the standard-signal support interpolation processing is carried out in the case of inputting a non-standard signal.

When the standard signal support interpolation processing in which the processing shown in FIGS. 2 and 3 is alternately executed is carried out on the non-standard signal and then the subsequent noise reduction processing is executed, a noise-reduced result as shown in FIG. 5 or FIG. 6 is achieved.

The non-standard signal is, as described above, a video signal whose horizontal synchronous signal is continuously in phase with respect to the vertical synchronous signal. That is, this means that it is recognized as the operation of the frame pulse generating circuit 21 that only the video signal of odd fields is continuously input or only the video signal of even fields is continuously input as the input video signal Din.

FIG. 5 shows the case where a video signal recognized as an odd field is continuously input to the input terminal 1 at the input time of the non-standard signal.

In the case of the non-standard signal, the horizontal synchronous signal is continuously in phase with respect to the vertical synchronous signal, so that the positions in the vertical direction of the respective pixels of the input video signal Din and the preceding field video signal Dpre are coincident with one another during continuous field periods.

Therefore, in the n-th field shown in FIG. 5, for example, [pixels P1, P2] of the field f2 as the preceding field video signal Dpre and [pixels P11, P12] of the field f1 as the input video signal Din are not shifted from each other by ½ pixel line, but located at the same position in the vertical direction.

In this case, since the odd fields are detected to be continuously input as the input video signal Din, only the interpolation processing described with reference to FIG. 2 is executed every continuous field. That is, the interpolation processing in which the input video signal Din is regarded as an odd field and the preceding field video signal Dpre is regarded as an even field is executed every continuous field.

Therefore, in the n-th field, the interpolated pixel P3 located at a distance of 1:3 with respect to the interval of the pixels P1 and P2 of the field f2 corresponding to the preceding field field video signal Dpre is achieved, and also the interpolated pixel P13 located at a distance of 3:1 with respect to the interval of the pixels P11 and P12 of the field corresponding to the input video signal Din. The pixel P21 of the field f2 corresponding to the preceding field video signal Dpre in the next (n+1)-th field is achieved as a noise-reduced pixel by subjecting the interpolated pixels P3, P13 to the noise reduction processing after the interpolation processing.

Here, the pixel P21 is output while located at the same position in the vertical direction as the pixels P2, P12 of the preceding n-th field.

In the (n+1)-th field, the same interpolation processing corresponding to FIG. 2 as the preceding n-th field is also carried out to achieve an interpolated pixel P23 located at a distance of 1:3 with respect to the interval of the pixels P21 and P22 of the field f2 corresponding to the preceding field video signal Dpre as shown in FIG. 2 and also achieve an interpolated pixel P33 located at a distance of 3:1 with respect to the interval of the pixels P31 and P32 of the field f1 corresponding to the input video signal Din. A pixel P41 which is subjected to the noise reduction processing on the basis of the interpolated pixels P23, P33 is achieved as a pixel of the preceding field field video signal Dpre in the next (n+2)-th field. The pixel P41 is located at the same position in the vertical direction as the pixels P22, P32 of the (n+1)-th field.

In the (n+2)-th field, the interpolation processing corresponding to FIG. 2 is likewise executed to achieve an interpolated pixel P43 located at a distance of 1:3 with respect to [pixels P41–P42] of the field f2 corresponding to the preceding field video signal Dpre and also achieve an interpolated pixel P53 located at a distance of 3:1 with respect to [pixels P51–P52] of the field f1 corresponding to the input video signal Din. A pixel P61 of the preceding field video signal Dpre of the next (n+3)-th field is achieved through the noise reduction processing using the interpolated pixels P43, P53. The pixel P61 is also output while located at the same position in the vertical direction as the pixels P42, P52 of the preceding (n+2)-th field.

As a result of the noise reducing operation shown in FIG. 5, the noise achieved as the pixel P1 in the n-th field is gradually reduced as the field is advanced like the subsequent (n+1)-th field→the (n+2)-th field→the (n+3)-th field, . . . , and pixels P21, P41, P61, . . . are successively achieved.

Here, in comparison of the positions of the pixels P1, P21, P41, P61, it can be confirmed that they are successively shifted downwardly by one horizontal pixel line every time the field period is advanced. This means that an actually displayed image is viewed like the noise thereof is propagating downwardly with time lapse although the noise is reduced.

FIG. 6 shows the noise reducing operation when the video signal of even fields is continuously input as a non-standard signal to the input terminal 1.

In this case, since it is detected that the even fields are continuously input as the input video signal Din, only the interpolation processing described with reference to FIG. 3 is executed every continuous fields. That is, the interpolation processing in which the input video signal Din is handled as an even field and the preceding field video signal Dpre is handled as an odd field is executed every continuous fields.

In this case, since the non-standard signal is continuously input, the pixel of the field f1 as the preceding field video signal Dpre and the pixel of the field f2 as the input video signal Din are located at the same position in the vertical direction.

In this case, the interpolated pixel P3 located at a distance of 3:1 with respect to the interval of the pixels P1 and P2 of the field f1 corresponding to the preceding field video signal Dpre is achieved in the n-th field. In this figure, the pixel P2 is represented by • to thereby regard the pixel P2 as a noise-superposed pixel. In addition, the interpolated pixel P13 located at a distance of 1:3 with respect to the interval of the pixels P11 and P12 of the field f1 corresponding to the input video signal Din is achieved. These interpolated pixels P3 and P13 are subjected to the noise reduction processing after the interpolation processing to achieve a noise-reduced pixel. In this case, a pixel P22 of the field f1 corresponding to the preceding field video signal Dpre in the (n+1)-th field is achieved as a noise-reduced pixel.

The pixel P22 thus noise-reduced is output while located at the same position in the vertical direction as the pixels P1, P11 of the preceding n-th field. That is, in this case, the noise-reduced pixel P22 is located above the original pixel P2 by one horizontal pixel line.

In the next (n+1)-th field, the interpolation processing corresponding to FIG. 3 is executed on [pixels P21–P22] of the field f1 corresponding to the preceding field video signal Dpre and [pixels P31–P32] of the field f2 corresponding to the input video signal Din as in the case of the preceding n-th field to achieve interpolated pixels P23, P33. The noise-reduction processing after the interpolation processing is executed on these interpolated pixels P23, P33 to achieve a pixel P42 of the subsequent (n+2)-th field as a noise-reduced pixel.

Likewise, in the (n+2)-th field, the interpolation processing corresponding to FIG. 3 is executed on [pixels P41–P42] of the field f1 corresponding to the preceding field video signal Dpre and [pixels P51–P52] of the field f2 corresponding to the input video signal Din to achieve interpolated pixels P43, P53. The noise reduction processing using the interpolated pixels P43, P53 is executed to achieve a pixel P62 of the subsequent (n+3)-th field as a noise-reduced pixel.

As a result of the interpolation processing and the noise reduction processing as shown in FIG. 6, the noise achieved as the pixel P2 in the n-th field is gradually reduced in the subsequent (n+1)-th field→the (n+2)-th field→the (n+3)-th field . . . , and the pixels P22, P42, P62, . . . , are subsequently achieved.

These pixels P2, P22, P42, P62 are successively upwardly shifted by one horizontal pixel line every the field period is advanced. That is, an actually displayed image is viewed like the noise thereof is shifting upwardly with time lapse although the noise is reduced.

In the case of the construction that the standard signal support interpolation processing is executed at all times as described above, when a standard signal is input, the noise reduction is properly carried out so that the noise is not shifted in the up-and-down direction as shown in FIG. 4. However, when a non-standard signal is input, the noise is viewed as shifting upwardly or downwardly as shown in FIG. 5 or FIG. 6. Such a noise shift is visually conspicuous and thus it is unfavorable.

When the interpolation processing shown in FIG. 2 or FIG. 3 is directly applied to the non-standard signal, as is apparent from the positional relationship of the two interpolated pixels (for example, the interpolated pixels P3, P13 in the n-th field) within the same field timing in FIGS. 5 and 6, the positions of the interpolated pixels in the vertical direction are not coincident with each other as an interpolation processing result.

Originally, the standard signal support interpolation processing aims to achieve a higher noise reducing effect by making coincident the pixel spatial positions in the vertical direction which are different between the odd and even fields by the Interlace system. Therefore, as shown in FIGS. 5 and 6, the pixel spatial positions in the vertical direction of the two interpolated pixels are different in the same field timing, and thus no effective noise reducing effect can be achieved.

Therefore, according to this embodiment, when the non-standard signal is input, signal processing supporting the non-standard signal (non-standard signal support processing) as described later is executed in place of the noise reduction processing containing the standard signal support interpolation processing to thereby avoid the problem described above.

Three examples of first to three examples are cited as the non-standard signal support processing of this embodiment. First, a first example will be described.

In the first example, when a non-standard signal is input to the input terminal 1, the filter coefficients are fixed as described later. When a standard signal is input to the input terminal 1, there are executed the normal interpolation processing (the standard signal support interpolation processing as described with reference to FIGS. 2, 3 and 4, and the noise-reducing operation after the interpolation processing described with reference to FIG. 1, which are carried out by the subtracter 7, the non-linear processing circuit 8 and the subtracter 9. That is, the "standard-signal supporting noise reducing operation" is carried out.

As described above, the frame pulse generating circuit 21 outputs the frame pulse FD corresponding to a signal which is inverted in accordance with the odd field and the even field. In this case, the frame pulse generating circuit 21 is constructed to output a frame pulse FD which is set to H level when the odd field is detected and L level when the even field is detected.

When the non-standard signal is input, it is regarded in the frame pulse generating circuit 21 that only the video signal of the odd field is input or only the video signal of the even field is input, and in connection with this, any one of the H level and L level is continuously output over continuous field periods. Accordingly, the frame pulse generating circuit 21 continuously outputs the frame pulse FD of H level when the video signal of odd fields is input as a non-standard signal and continuously outputs the frame pulse FD of L level when the video signal of even fields is input.

In the non-standard signal detecting circuit 22, the non-standard signal is detected while discriminating the case where the video signal of an odd field is input (FD=H) and the case where the video signal of an even field is input (FD=L) from each other. In the interpolating filters 2, 5, the combination of the filter coefficients to be fixed is varied on the basis of the detection output from the non-standard signal detecting circuit 22 between the non-standard signal detection time when the video signal of the odd field is input (FD=H) and the non-standard signal detection time when the video signal of the even field is input (FD=L) as described later.

Figure 7:
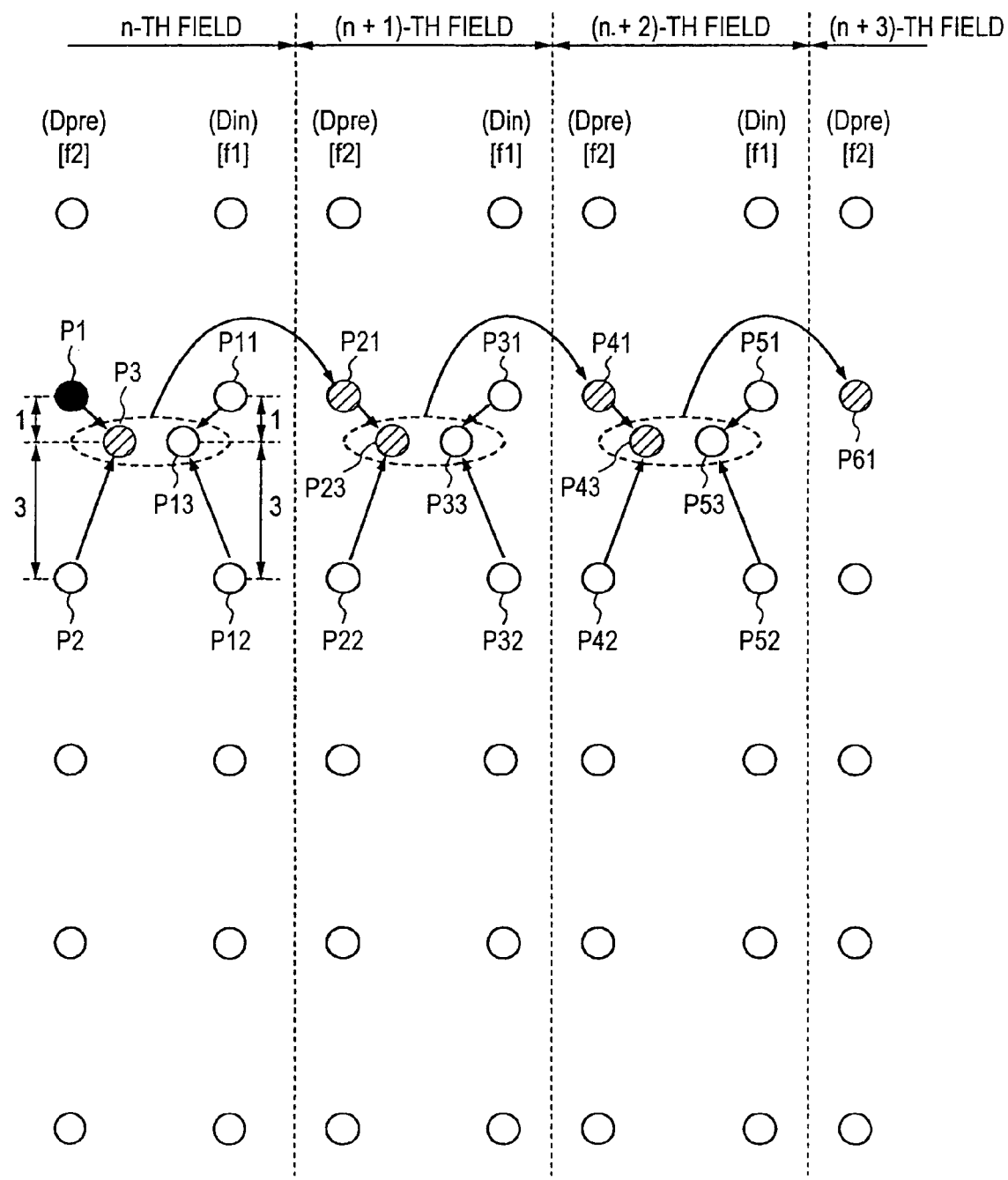
FIG. 7 is a diagram schematically showing the noise reducing operation based on the non-standard signal supporting processing as a first example in the present invention.

FIG. 7 shows the noise reducing operation when in the first example, the frame pulse FD is set to the H level and the video signal of an odd field is input as a non-standard signal.

In this case, since the non-standard signal as the video signal of the odd field is input from the input terminal 1, the input video signal Din is handled as the field f1 (odd field) and the preceding field video signal Dpre is handled as the field f2 (even field) in each of the n-th to (n+3)-th fields.

However, actually, the respective pixels in the field f1 and the field f2 within the same field period are set to be coincident to each other in spatial position in the vertical direction by inputting the non-standard signal.

In such a case, as shown as the interpolation processing of the n-th field, for example, the coefficients are set in the field f2 corresponding to the preceding field video signal Dpre so as to achieve the interpolated pixel P3 located at a distance of 1:3 for [pixels P1–P2], and the coefficients are also set in the field f1 corresponding to the input video signal Din so as to achieve the interpolated pixel P13 located at a distance of 1:3 for [Pixels P11–P12]. That is, as the interpolation processing using two pixels adjacent to each other in the up-and-down direction, the coefficients are set for all the interpolated filters 2, 5 so as to achieve an interpolated pixel located at a distance of 1:3. The coefficients thus set are kept fixed during a period for which the video signal of an odd field is input (FD=H) as a non-standard signal.

Accordingly, for example, in the n-th field, the interpolated pixel P3 achieved by using the pixels P1, P2 of the field f2 and the interpolated pixel P13 achieved by using the pixels P11, P12 of the field f1 can be located at the same pixel space in the vertical direction. The noise-reducing operation after these interpolated pixels are used is carried out like the normal case. That is, the subtracter 7, the non-linear processing circuit 8 and the subtracter 9 execute the same operations as described with reference to FIG. 1. The pixel P21 generated by carrying out the noise reduction using the interpolated pixels P13, P13 can be located at the vertical spatial position as the pixel P1 on which the original noise is superposed.

In the next (n+1)-th field, the interpolating filters 2, 5 execute the interpolation processing by using the same coefficients as the preceding n-th field. Accordingly, as shown in the figure, the interpolated pixel P23 using the pixels P21, P22 of the field f2 and the interpolated pixel P33 using the pixels P31, P32 of the field f1 are generated so as to be located at the same pixel space in the vertical direction. The pixel P41 which is noise-reduced by using the interpolated pixels P23, P33 is output so as to be located at the same height horizontal pixel line as the pixels P1, P21.

Likewise, in the subsequent (n+2)-th field, the interpolating filters 2, 5 execute the interpolation processing by using the same coefficients as the preceding field period to generate the interpolated pixel P43 using the pixels P41, P42 of the field f2 and the interpolated pixel P53 using the pixels P51, P52 of the field f1 so that they are located at the same pixel space in the vertical direction. The pixel P61 which is noise-reduced by using the interpolated pixels P43, P53 is output so as to be located at the same height horizontal pixel line as the pixels P1, P21, P41. For the subsequent fields, the interpolating filters 2, 5 carry out the interpolation processing by using the fixed coefficients, and then the noise reducing operation is carried out.

Figure 8:
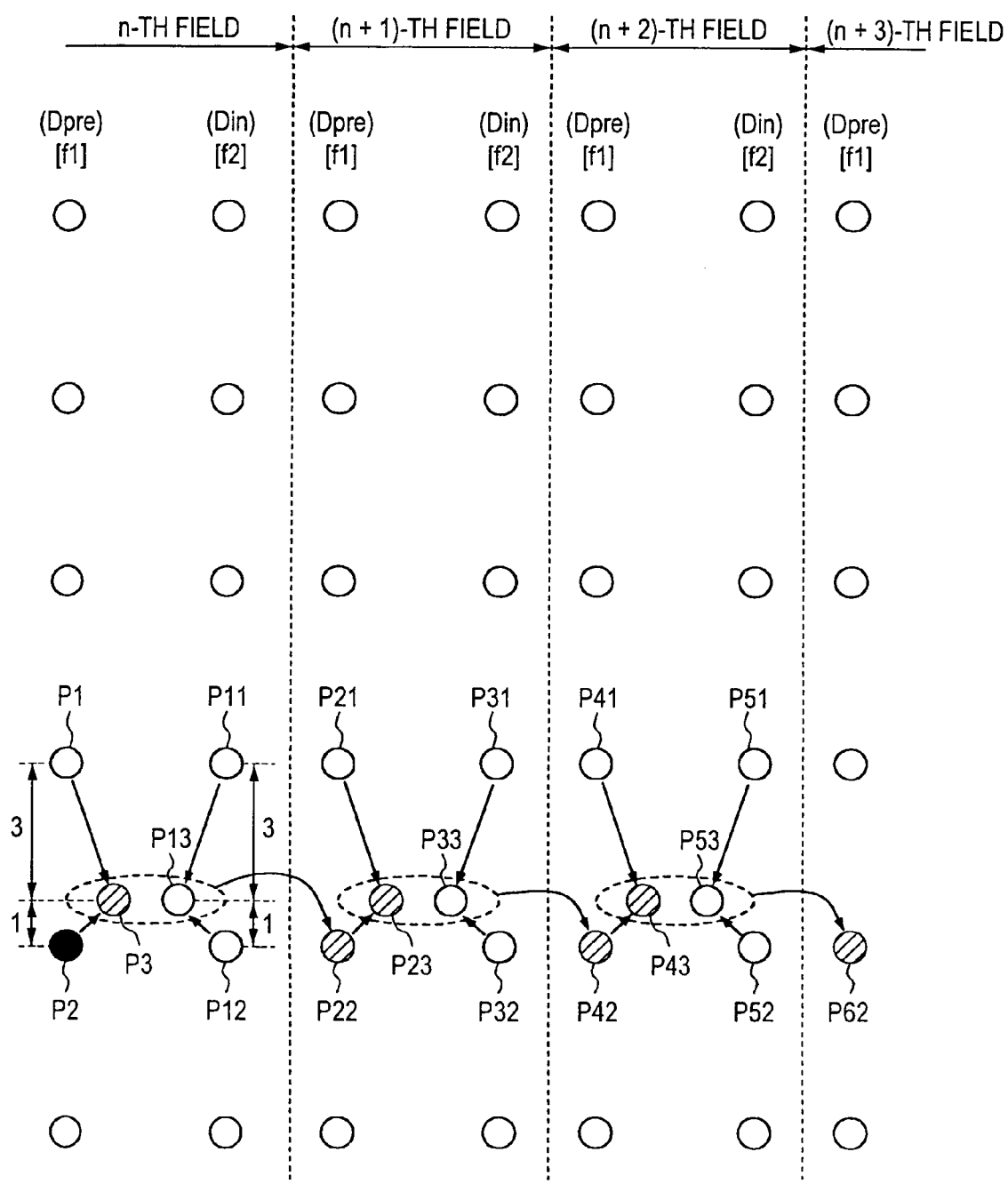
FIG. 8 is a diagram schematically showing the noise reducing operation based on the non-standard signal supporting processing as a first example in the present invention.

Subsequently, the operation when the video signal of even fields (FD=L) is input as a non-standard signal is shown in FIG. 8.

In the case of FIG. 8, since the non-standard signal is input as the video signal of even fields from the input terminal 1, it is regarded that in each field timing, the field f2 (even field) is input as the input video signal Din, and the field f1 (odd field) is input as the preceding field video signal Dpre. Furthermore, in this case, P2 is represented by * to indicate that a noise-superposed pixel is P2.

In this case, the respective pixels of the field f1 and the field f2 in the same field period are also kept to be coincident with one another in the spatial position in the vertical direction.

The coefficients are set for the interpolating filters 2, 5 as follows.

For example, in the case of the interpolation processing shown in the n-th field, the coefficients are set for the field f1 corresponding to the preceding field video signal Dpre so as to achieve the interpolated pixel P3 located at a distance of 3:1 with respect to the interval of the pixels P1 and P2, and the coefficients are set for the field f2 corresponding to the input video signal Din so as to achieve the interpolated pixel P13 located at a distance of 3:1 with respect to the interval of the pixels P11 and P12.

That is, the coefficients are set for all the interpolating filters 2, 5 so as to achieve an interpolated pixel located at a distance of 3:1 through the interpolation processing using two adjacent pixels in the up-and-down direction. The coefficients thus set are fixedly set insofar as it is detected that an even field is input as a non-standard signal (FD=L).

By setting the coefficients as described above, the interpolated pixel P3 achieved by using the pixels P1 and P2 of the field f1 and the interpolated pixel P13 achieved by using the pixels P11 and P12 of the field f2 are located at the same pixel space in the vertical direction in the n-th field like the previous case shown in FIG. 7. The pixel P22 achieved by carrying out the noise reduction using the interpolated pixels P3, P13 is located at the same height horizontal pixel line as the pixel P2 on which the original noise is superposed.

In the subsequent (n+1)-th field, the (n+2)-th field, the interpolating filters 2, 5 execute the interpolation by using the same coefficients as the preceding n-th field.

Accordingly, the interpolated pixel P23 generated by using the pixels P21, P22 of the field f2 and the interpolated pixel P33 generated by using the pixels P31, P32 of the field f1 are located at the same vertical pixel space in the (n+1)-th field. The pixel P42 which is noise-reduced by using the interpolated pixels P23, P33 is output while located at the same height horizontal pixel line as the pixels P2, P22.

In the (n+2)-th field, the interpolated pixel P43 generated by the pixels P41, P42 of the field f2 and the interpolated pixel P53 generated by the pixels P51, P52 of the field f1 are located at the same pixel space in the vertical direction. The pixel P62 which is noise-reduced by using the interpolated pixels P43, P53 is output while located at the same height horizontal pixel line as the pixels P2, P22, P42.

As shown in FIG. 7 and FIG. 8, the coefficients of the interpolating filters 2, 5 are fixed to common predetermined values, and then the noise reducing operation containing the interpolation processing based on the coefficients thus set is executed. As a result of the noise reducing operation, the noise-reduced pixel P1 (P2) and the pixels P21 (P22), P41 (P42), P61 (P62) which are estimated to be reduced in noise from the pixel P1 (P2) are located at the same horizontal pixel line. That is, there is prevented occurrence of such a phenomenon that the noise being reduced is shifted upwardly or downwardly.

Furthermore, in each field timing, the interpolated pixels which are interpolated by the interpolating filters 2, 5 are set to be located at the same spatial position in the vertical direction, so that a more effective noise reducing effect can be achieved.

Next, the non-standard signal support processing as a second example will be described.

In the second example, when it is detected that a non-standard signal is input to the non-standard signal detecting circuit 22, the interpolation processing of the interpolating filters 2, 5 is set to OFF. Here, "the interpolation processing of the interpolating filters 2, 5 is set to "OFF"" means that no interpolation processing is carried out and the video signal data of a pixel unit input is directly passed and output. In the second example, the interpolating filters 2, 5 are set to OFF without discriminating the case where the video signal of an odd field is input (FD=H) as a non-standard signal and the case where the video signal of an even field (FD=L) is input as a non-standard signal from each other.

In the second example, when it is detected by the non-standard signal detecting circuit 22 that a standard signal is input, "the standard-signal support noise reducing operation" is executed as in the case of the first example.

Figure 9:
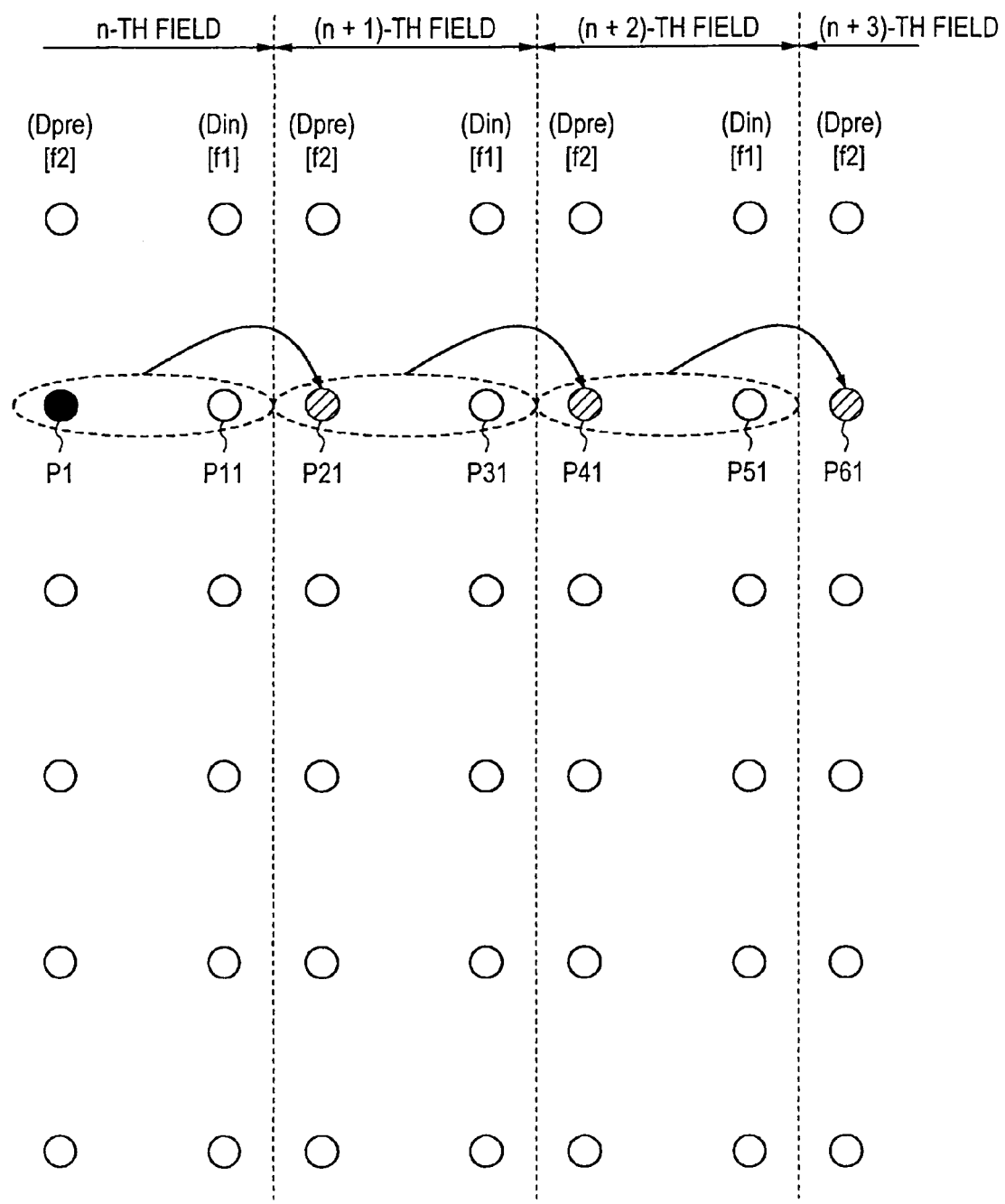
FIG. 9 is a diagram schematically showing the noise reducing operation based on the non-standard signal supporting processing as a second example in the present invention.

The non-standard signal support processing as the second example is shown in FIG. 9.

In this case, there is shown an example in which the video signal of an odd field is input as an example of a non-standard signal. That is, the input video signal Din is handled as a field f1, and the preceding field video signal Dpre is handled as a field f2.

As described above, the operation of the interpolating filters 2, 5 is set to OFF in the second example. Therefore, in the n-th field, the pixel P1 on which a noise is regarded as being superposed in the field f2 and the pixel P11 located at the same vertical spatial position as the pixel P1 in the field f1 are not subjected to the interpolation processing and directly output. The noise reducing operation is executed by the circuits (the subtracter 7, the non-linear processing circuit 8, the subtracter 9) subsequent to the interpolating filters 2, 5, thereby achieving the pixel P21 which is subjected to the noise reduction processing using the pixels P1, P11.

The pixel P21 is a pixel contained in the field f2 (preceding field video signal Dpre) of the next (n+1)-th field, and located at the same vertical spatial position as the pixels P1, P11.

The same operation is carried out in the subsequent (n+1)-th field, and the pixel P41 contained in the field f2 is achieved in the next (n+2)-th field by carrying out the noise reduction processing using the pixel P21 of the field f2 and the pixel P31 of the field f1.

Furthermore, the same operation is also carried out in the next (n+2)-th field, and the pixel P61 contained in the field f2 is achieved in the next (n+3)-th field by the noise reduction processing using the pixel P41 of the field f2 and the pixel P51 of the field f1.

As described above, all the pixels P21, P41, P61 which are estimated to be attained from the noise reduction of the pixel P1 are located at the same horizontal pixel line as the pixel P1.

Accordingly, even when both the interpolation processing of the interpolating filters 2, 5 are set to OFF like the second example, there is prevented occurrence of such a phenomenon that the noise being reduced is shifted upwardly or downwardly. In this case, the interpolation processing itself is not executed, so that the vertical spatial positions of two interpolated pixels achieved at the same field period are not displaced from each other.

Subsequently, the non-standard signal support processing of a third example will be described.

As the third example, the detection signal of the non-standard signal detecting circuit 22 is supplied to the non-linear processing circuit 8. If it is detected on the basis of the detection signal supplied from the non-standard signal detecting circuit 22 that the input signal is a non-standard signal, the non-linear processing circuit 8 outputs no non-linear processing signal (noise component signal) to the subtracter 9. Therefore, the output level may be forcedly set to 0 level in the non-linear processing circuit 8, for example.

By stopping the output from the non-linear processing circuit 8 as described above, the subtraction of the noise component signal is not carried out on the input video signal Din in the subtracter 9. That is, the noise reducing operation itself is stopped. In this case, the "standard signal supporting noise reducing operation" is also carried out when a standard signal is input.

This manner can also prevent occurrence of such a phenomenon that the noise is shifted upwardly or downwardly, for example, shown in FIGS. 5 and 6. However, in this case, the input video signal Din is directly output as an output video signal from the output terminal, and no noise reducing effect is achieved.

However, some signal states of the input video signal Din as the non-standard signal may induce such a probability that the noise reducing operation (the operation of the interpolating filter) described in the first example or the second example is not properly executed and a disturbed image is rather achieved. In such a case, it is expected to select the operation of stopping the noise reducing operation like the third example as more effective means.

Therefore, according this embodiment, the following construction may be possible. That is, for example when a non-standard signal is input, the quality of the non-standard signal is judged. If the judgment result indicates that the quality is higher than a predetermined value, the non-standard signal support processing of the first example or second example is executed to carry out the noise reducing operation supporting the non-standard signal. If the quality is lower than the predetermined value, the non-standard signal support processing of the third example is executed to stop the noise reducing operation.

Three examples of the non-standard signal support processing according to this embodiment have been described. Here, the flow of the operation of the noise reducing circuit according to the input signal state in this embodiment will be described with reference to the flowchart of FIG. 10.

As the operation shown in this figure is taken an example having such a construction that even when the non-standard signal is input, any one of the non-standard signal support processing of the first example or the second example and the non-standard signal support processing of the third example is executed in accordance with the signal state. In order to implement the operation shown in this figure, the non-linear processing circuit 8 and the interpolating filters 2, 5 switch the operation thereof on the basis of the detection output of the non-standard signal detecting circuit 22.

Figure 10:
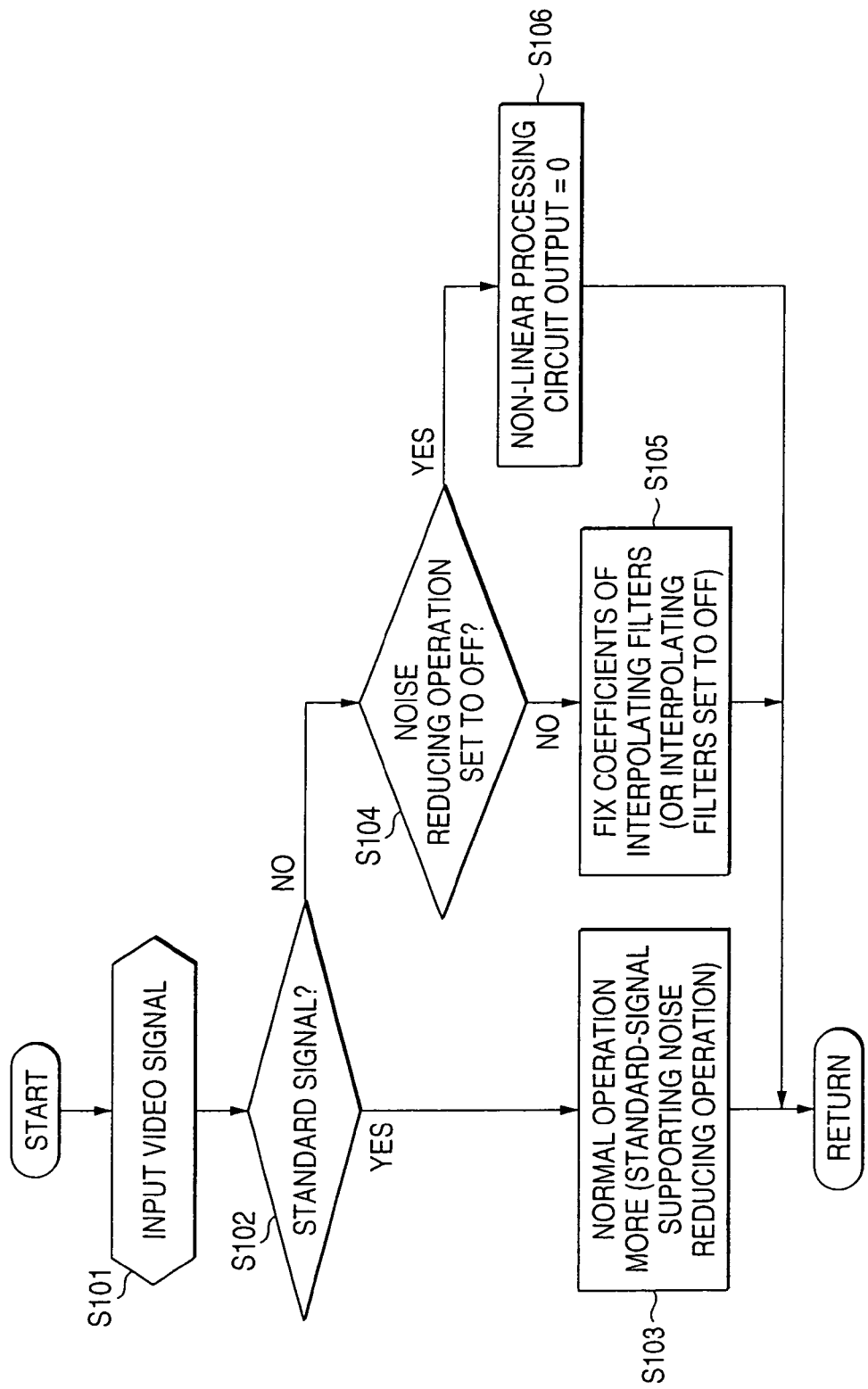
FIG. 10 is a flowchart showing the operation flow of the noise reducing circuit according to this embodiment.

In FIG. 10, a video signal is first input in step S101. That is, the input video signal Din is achieved. In next step S102, it is detected whether the input video signal Din is a standard signal or not. The operation of the step S102 is carried out by the non-standard signal detecting circuit 22. If a positive result indicating the standard signal is achieved as a detection result, the normal operation mode is set as the processing of the step S103, thereby achieving the noise reducing operation supporting the standard signal as described with reference to FIGS. 1, 2, 3 and 4.

On the other hand, if a negative result indicating the non-standard signal is achieved as a detection result of the step S102, the processing goes to step S104 to judge whether the noise reducing operation is turned off or not. For this purpose, the non-standard signal detecting circuit 22 may be constructed so as to detect a prescribed parameter for the non-standard signal so that a judgment on quality can be made for the non-standard signal, so that a judgment result can be output on the basis of the judgment result of the quality.

For example, when it is judged that the noise reducing operation is not set to OFF, the interpolating filters are controlled so that the coefficients of the interpolating filters are fixed or the interpolating filters are set to OFF as shown in step S105. That is, the operation of the non-standard signal support processing as the first example or the second example is executed.

On the other hand, if it is judged that the noise reducing operation should be set to OFF, the output of the non-linear processing circuit 8 is set to 0 level to stop the noise reducing operation as shown in step S106. That is, the operation of the non-standard signal support processing as the third example is executed.

One of the operation of the non-standard signal support processing as the first example and the operation of the non-standard signal support processing as the second example may be selectively performed in accordance with the quality as the non-standard signal.

The setting of the filter coefficients for the interpolating filters 2, 5 shown in FIGS. 7 and 8 is an example, and any setting may be performed insofar as the interpolated pixels are located at the same vertical pixel spatial position as a result of the interpolation processing and a pixel which is noise-reduced by using two interpolated pixels is located at the same vertical spatial position as a pixel before the noise reduction is carried out.

Furthermore, the noise reducing device to which the present invention is applied is not limited to the construction shown in FIG. 1, and it may be modified as occasion demands. For example, in the circuit construction shown in FIG. 1, the video signal data read out from the work memories 3, 6 are used for the motion detection of the motion vector detecting circuit 10, however, the motion detection may be carried out by using the video signal data output from the interpolating filters 2, 5. Furthermore, even in the case of the construction that the non-standard signal is detected, it is not limited to the construction that it is equipped with the circuit system comprising the frame pulse generating circuit 21 and the non-standard signal detecting circuit 22 shown in FIG. 1.

As described above, according to the present invention, when the non-standard signal is input as the input video signal, the non-standard signal support processing corresponding to the other signal processing which is accompanied by no standard-signal supporting interpolation processing (standard signal support interpolation processing) is executed.

For example, when the noise reducing operation accompanying the standard-signal support interpolation processing is executed even at the input time of the non-standard signal like the prior art, the proper noise reducing result can not be effectively achieved, which is represented by such a phenomenon that the noise is upwardly or downwardly shifted. However, such a disadvantage can be avoided by carrying out the non-standard signal support processing accompanying no standard-signal support interpolation processing in accordance with input of the non-standard signal like the present invention.

As one manner of the non-standard signal support processing, the filter coefficients for interpolation are fixed to predetermined values. Alternatively, the interpolation processing is stopped and the input signal is directly output. Through these processing, the noise can be effectively reduced with avoiding such a phenomenon that the noise is upwardly or downwardly shifted.

Furthermore, if the output based on the non-linear processing is stopped as the non-standard signal support processing, the noise reducing operation itself is stopped. This also avoids such a phenomenon that the noise is upwardly or downwardly shifted. When the output based on the non-linear processing is stopped as described above, no noise reducing effect is achieved. However, in some non-standard signal states, this is effectively applied to such a case that it is unfavorable to forcedly execute the noise reducing operation.

The invention claimed is:

1. A video signal processing device, characterized by comprising:

interpolating means for executing interpolation processing adapted for a standard signal, the interpolation processing being executed so that when an input video signal of a video unit is a standard signal, the spatial positions of pixels in the vertical direction are made coincident between the input video signal and an input video signal that is preceding to the former input video signal by one picture unit;

differential means for achieving a differential signal for the input video signal interpolatively processed by said interpolating means and the one-picture-unit preceding input video signal which is interpolatively processed by said interpolating means;

noise component signal extracting means for extracting a noise component signal from the differential signal achieved by said differential means;

synthesizing means for synthesizing a noise component signal for the input video signal; and judging means for judging whether the input video signal is a standard signal or non-standard signal, wherein when it is judged by said judging means that the input video signal is a standard signal, said interpolating means executes the interpolation processing adapted for the standard signal, and when it is judged by said judging means that the input video signal is a non-standard signal, said interpolating means or said noise component signal extracting means executes required processing adapted for the non-standard signal concerned.

2. The video signal processing device as claimed in claim 1, wherein in the processing adapted for the non-standard signal, said interpolating means executes interpolation processing using coefficients which are set to predetermined fixed values so that the pixels of an input video signal as a non-standard signal and the pixels of a preceding input video signal which is preceding to the former input video signal by one picture unit are located at the same spatial positions in the vertical direction.

3. The video signal processing device as claimed in claim 1, wherein in the processing adapted for the non-standard signal, said interpolating means executes processing for outputting the input signal without executing any interpolation processing on the input signal.

4. The video signal processing device as claimed in claim 1, wherein in the processing adapted for the non-standard signal, said noise component signal extracting means executes processing in which no noise component signal is output.

5. A video signal processing method, characterized by comprising:

an interpolating step for executing interpolation processing adapted from a standard signal, the interpolation processing being executed so that the spatial positions of pixels in the vertical direction are made coincident between an input video signal of a picture unit and a preceding input video signal which is preceding to the former input video signal by one picture unit when the input video signal is a standard signal;

a differential step for achieving a differential signal for the input video signal interpolatively processed in said interpolating step and the one-picture-unit preceding input video signal which is interpolatively processed in said interpolating step;

a noise component signal extracting step for extracting a noise component signal from the differential signal achieved in said differential step;

a synthesizing step for synthesizing a noise component signal for the input video signal; and a judging step for judging whether the input video signal is a standard signal or non-standard signal, wherein when it is judged in said judging step that the input video signal is a standard signal, said interpolating step executes the interpolation processing adapted for the standard signal, and when it is judged that the input video signal is a non-standard signal, said interpolating step or said noise component signal extracting step executes required processing adapted for the non-standard signal concerned.

6. The video signal processing method as claimed in claim 5, wherein in the processing adapted for the non-standard signal, said interpolating step executes the interpolation processing using coefficients which are set to predetermined fixed values so that the pixels of an input video signal as a non-standard signal and a preceding input video signal which is preceding to the former input video signal by one picture unit are located at the same spatial positions in the vertical direction.

7. The video signal processing method as claimed in claim 5, wherein in the processing adapted for the non-standard signal, said interpolating step executes processing for outputting the input signal as a processing target without executing any interpolation processing on the input signal.

8. The video signal processing method as claimed in claim 5, wherein in the processing adapted for the non-standard signal, said noise component signal extracting step executes processing in which no noise component signal is output.

* * * * *